United States Patent
Takazawa et al.

(10) Patent No.: US 11,804,741 B2
(45) Date of Patent: Oct. 31, 2023

(54) MOTOR

(71) Applicant: TOYOTA JIDOSHA KABUSHIKI KAISHA, Toyota (JP)

(72) Inventors: Mayumi Takazawa, Okazaki (JP); Kazuaki Haga, Toyota (JP); Toshimitsu Takahashi, Toyota (JP); Takuya Nomura, Kasugai (JP); Shinya Sano, Toyota (JP); Yasuhide Yagyu, Nagakute (JP); Takeshi Tomonaga, Nisshin (JP); Hisanori Koma, Miyoshi (JP); Keiu Kanada, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/661,831

(22) Filed: May 3, 2022

(65) Prior Publication Data

US 2022/0376567 A1 Nov. 24, 2022

(30) Foreign Application Priority Data

May 20, 2021 (JP) ................................. 2021-085404

(51) Int. Cl.
*H02K 1/02* (2006.01)
*H02K 1/26* (2006.01)
*H02K 7/00* (2006.01)
*H02K 1/06* (2006.01)

(52) U.S. Cl.
CPC ............... *H02K 1/265* (2013.01); *H02K 1/02* (2013.01); *H02K 1/06* (2013.01); *H02K 7/003* (2013.01); *H02K 2213/03* (2013.01)

(58) Field of Classification Search
CPC ............ H02K 1/02; H02K 1/16; H02K 1/141; H02K 1/246; H02K 1/265
See application file for complete search history.

(56) References Cited

U.S. PATENT DOCUMENTS 9,502,952 B2 * 11/2016 Hofmeister ............ H02K 37/20

FOREIGN PATENT DOCUMENTS

| JP | 2004343905 A | 12/2004 |
| JP | 2005151616 A | 6/2005 |

* cited by examiner

*Primary Examiner* — Dang D Le
(74) *Attorney, Agent, or Firm* — Dickinson Wright, PLLC (57) ABSTRACT

A motor includes a rotor fixed to a rotary shaft, a stator arranged so as to surround the rotor with a gap from the rotor in a radial direction orthogonal to an axis direction of the rotary shaft, and a case accommodating the rotor and the stator. The rotor includes a plurality of rotor cores made from a soft magnetic material, and a rotor fixing member that fixes the rotor cores. The stator includes a plurality of stator cores made from a soft magnetic material, a stator fixing member that fixes the stator cores, and coils wound around the stator cores, respectively. The motor includes at least two sets of the rotor and the stator, and the sets are stacked in an axis direction of the rotary shaft.

4 Claims, 9 Drawing Sheets

MOTOR

CROSS-REFERENCE TO RELATED APPLICATION

This application claims priority to Japanese Patent Application No. 2021-085404 filed on May 20, 2021, incorporated herein by reference in its entirety.

BACKGROUND

1. Technical Field

The disclosure relates to a motor, especially to a radial gap-type motor.

2. Description of Related Art

As a radial gap-type motor, a motor described in, for example, Japanese Unexamined Patent Application Publication No. 2004-343905 (JP 2004-343905 A) is known. The motor described in JP 2004-343905 A is a so-called outer rotor-type motor, and includes a stator and a rotor. The stator is fixed to a rotary shaft and includes a plurality of stator cores and coils that are wound around the stator cores, respectively. The stator cores protrude in a direction away from the rotary shaft. The rotor is provided so as to surround the stator in a radial direction orthogonal to the rotary shaft, and includes a plurality of rotor cores that face the stator cores, respectively.

SUMMARY

However, the above-mentioned outer rotor-type motor has a structure in which the stator cores and the coils are arranged inwardly (in other words, on the rotary shaft side) of the motor. Therefore, when the number of winding turns of each of the coils is increased in order to increase output torque of the motor, the size of the entire motor gets large, and this has caused a problem that size reduction is difficult.

The disclosure has been accomplished in order to solve this type of technical problem, and an object thereof is to provide a motor that size reduction is achieved while increasing output torque.

A motor according to the disclosure includes a rotor fixed to a rotary shaft, and a stator arranged so as to surround the rotor with a gap from the rotor in a radial direction orthogonal to an axis direction of the rotary shaft. The rotor includes a plurality of first winding cores made from a soft magnetic material, and a rotor fixing member that fixes the first winding cores. The stator includes a plurality of second winding cores made from a soft magnetic material, a stator fixing member that fixes the second winding cores, and coils wound around the second winding cores, respectively. The motor includes at least two sets of the rotor and the stator, and the sets are stacked in the axis direction of the rotary shaft.

The motor according to the disclosure has a structure in which the stator having the plurality of the second winding cores and the coils wound around the second winding cores, respectively, is arranged outwardly of the rotor. Therefore, in comparison to a conventional outer rotor-type motor, a larger space for the coils is ensured easily, and it is thus possible to increase the number of winding turns of the coils. As a result, it is possible to increase output torque of the motor and achieve size reduction of the motor. In addition, there are at least two sets of the rotor and the stator, and they are stacked along the axis direction of the rotary shaft. Therefore, it is possible to further increase the output torque of the motor compared to the case where there are one rotor and one stator.

In the motor according to the disclosure, the first winding cores and the second winding cores may be arranged so that width directions of the first winding cores and the second winding cores extend along a rotational direction of the rotor, and a width of each of the first winding cores may be larger than a width of each of the second winding cores. Thus, it is possible to ensure even larger space for the coils, and it is thereby possible to increase the output torque of the motor even further.

Also, in the motor according to the disclosure, the first winding cores and the second winding cores may be arranged so that width directions of the first winding cores and the second winding cores are parallel to the axis direction of the rotary shaft. Also, the number of the first winding cores and the number of the second winding cores may be the same. When the number of the second winding cores is Ns, and the number of sets of the rotor and the stator is n, energization of each of the sets may be switched so that the rotor of each of the first set through the n-th set is rotated by $360°/(Ns \times n)$. Thus, the rotors are rotated continuously, and it is thus possible to drive the motor more smoothly.

In the motor according to the disclosure, the second winding cores of all of the sets may be arranged at the same positions, respectively. Also, at an initial position, the first winding cores of the first set may be arranged at positions rotated by $360°/(Ns \times n)$ in a direction opposite to a rotational direction of the rotary shaft with respect to the second winding cores of the first set, respectively. In addition, the first winding cores of the first set through the n-th set may be arranged at positions rotated by $360°/(Ns \times n)$ in the direction opposite to the rotational direction of the rotary shaft from set to set. Thus, since the rotors are rotated continuously, it is possible to drive the motor more smoothly.

Further, in the motor according to the disclosure, the first winding cores of all of the sets may be positioned at the same positions, respectively. Also, at an initial position, the second winding cores of the first set may be arranged at positions rotated by $360°/(Ns \times n)$ in a rotational direction of the rotary shaft with respect to the first winding cores of the first set, respectively. At the same time, the second winding cores of the first set through the n-th set may be arranged at positions rotated by $360°/(Ns \times n)$ in the rotational direction of the rotary shaft from set to set. Thus, the rotors are rotated continuously, and it is thus possible to drive the motor more smoothly.

According to the disclosure, it is possible to increase the output torque and achieve size reduction at the same time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of a motor according to the disclosure are described with reference to the drawings. In the description in the drawings, the same reference numerals are used for the same elements, and duplicated description is omitted. Also, in order to avoid complexity of the description, "a radial direction orthogonal to an axis direction of a rotary shaft" is sometimes simply reduced to a "radial direction".

First Embodiment

Figure 1:
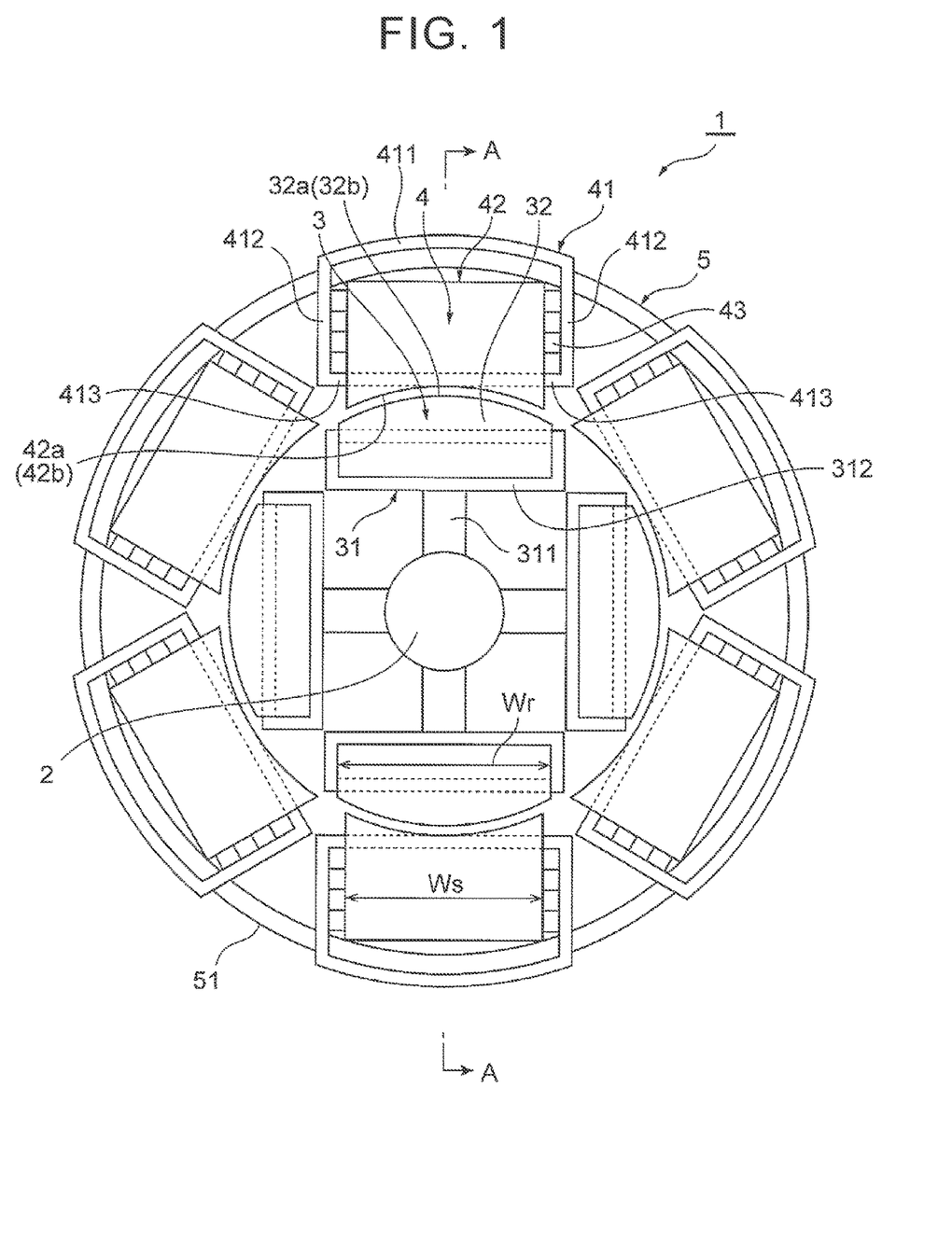
FIG. 1 is a schematic plan view of a motor according to a first embodiment.
Figure 2:
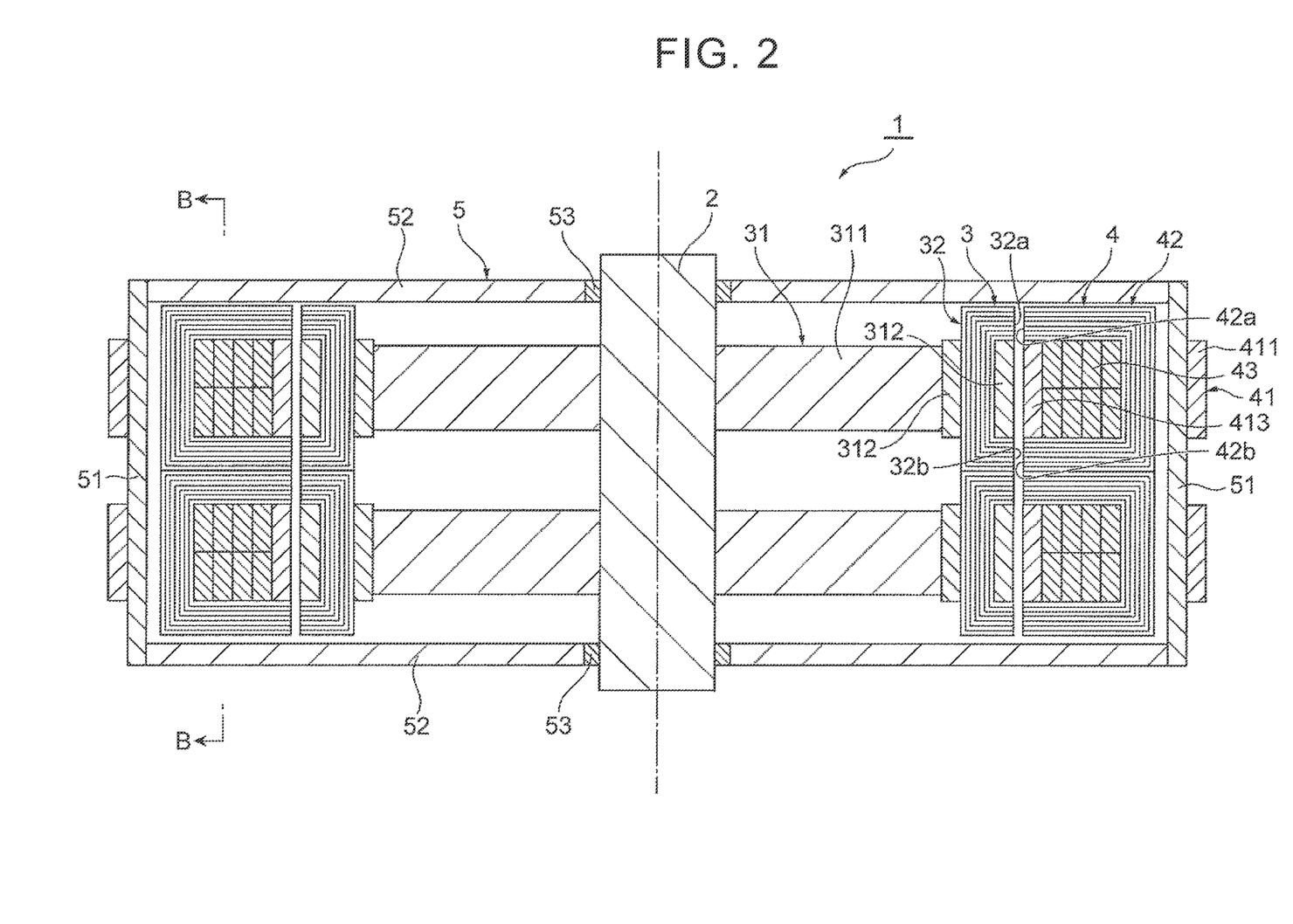
FIG. 2 is a schematic sectional view taken along the line A-A in FIG. 1.

FIG. 1 is a schematic plan view of a motor according to a first embodiment, and FIG. 2 is a schematic sectional view taken along the line A-A in FIG. 1. The motor 1 according to the embodiment is a motor without magnet. The motor 1 is so-called an inner rotor-type motor, and includes a metallic rotary shaft 2, a rotor 3 fixed to the rotary shaft 2, a stator 4, and a case 5 that accommodates the rotor 3 and the stator 4. The stator 4 is arranged so as to surround and face the rotor 3 with a gap from the rotor 3 in a radial direction orthogonal to an axis direction of the rotary shaft 2.

There are two sets of the rotor 3 and the stator 4, and the sets are stacked along the axis direction of the rotary shaft 2. In the embodiment, one stator 4 and one rotor 3 located on the upper side with respect to the sheet surface of FIG. 2 is the first set, and another stator 4 and another rotor 3 located on the lower side are the second set. In the example described as the embodiment, the number of poles of the rotor 3 is four, and the number of poles of the stator 4 is six in each of the sets. However, the numbers of poles of the rotor 3 and the stator 4 are not limited to them. The number of poles of the rotor 3 means the number of rotor cores 32 (described later), and the number of poles of the stators 4 means the number of stator cores 42 (described later).

The case 5 includes a cylindrical side surface portion 51, and a pair of disc-shaped lid portions 52 that close openings of both ends of the side surface portion 51, respectively. A bearing member 53 is attached to a central part of each of the lid portions 52 and supports the rotary shaft 2 so that the rotary shaft 2 is able to rotate. A material of the case 5 is not particularly limited, but metal is preferred in terms of mechanical strength and heat radiation.

The rotor 3 includes a plurality of the (in this example, four) rotor cores (first winding cores) 32, and rotor fixing members 31 that fix the rotor cores 32, respectively. The rotor cores 32 are arranged at equal intervals along a circumferential direction of the motor 1.

Figure 3:
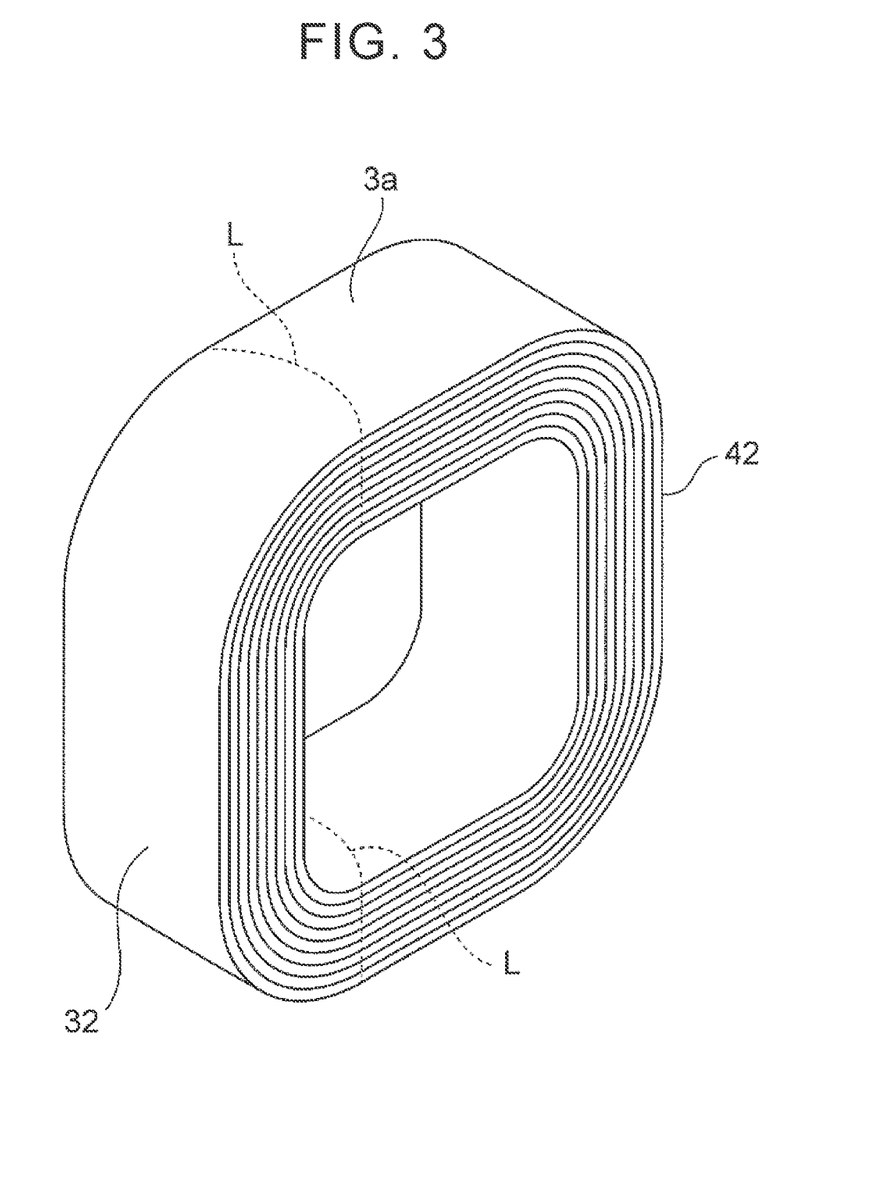
FIG. 3 is a perspective view describing how to form a rotor core and a stator core.

Each of the rotor cores 32 is made of a cut core that is formed into a U shape with use of, for example, a soft magnetic material. For example, as shown in FIG. 3, the cut core is formed as a wound body 3a is divided, the wound body 3a being made as a belt-shaped soft magnetic material is wound more than once. The reference symbol L in FIG. 3 shows a dividing position of the wound body 3a. Then, when a width of the rotor core 32 and a width of the stator core 42 that is described later are equal, and also a thickness of the rotor core 32 and a thickness of the stator core 42 are equal, the single wound body 3a is able to produce one rotor core 32 and one stator core 42. However, when the rotor core 32 and the stator core 42 have different widths and thicknesses, the single wound body 3a is able to produce the two rotor cores 32 (or the stator cores 42).

The rotor core 32 is arranged so that its width direction extends along a rotational direction of the rotor 3 (in other words, the circumferential direction of the motor 1). The width direction described here is a short direction of the belt-shaped soft magnetic material shown in FIG. 3.

A material of the motor core 32 is not particularly limited as long as it is a soft magnetic material, and, for example, an oriented or non-oriented electromagnetic steel sheet, iron-based soft magnetic amorphous, cobalt-based soft magnetic amorphous, a nanocrystal soft magnetic material, or an iron-cobalt permendur material may be used. In the embodiment, use of the oriented electromagnetic steel sheet is preferred. This is because, in the case of the oriented electromagnetic steel sheet, a crystal orientation is aligned in the longitudinal direction (also referred to as a rolling direction) of the oriented electromagnetic steel sheet, and the oriented electromagnetic steel sheet has an axis of easy magnetization in that direction, which gives the rotor core 32 formed an excellent magnetic characteristic.

The rotor core 32 has two end surfaces (divided surfaces) 32a, 32b facing the same direction. The end surfaces 32a, 32b of the rotor core 32 and end surfaces 42a, 42b of the stator core 42 described later face each other, respectively, in the radial direction. In the state where the end surfaces 32a, 32b of the rotor core 32 face the end surfaces 42a, 42b of the stator core 42 described later, magnetic flux generated from the end surface 42a or 42b of the stator core 42 enters the end surface 32a or 32b of the rotor core 32, passes inside the rotor core 32, exits from the end surface 32b or 32a, and then enters the end surface 42b or 42a of the stator core 42.

As shown in FIG. 2, the rotor 3 of the first set and the rotor 3 of the second set are arranged next to each other along the axis direction of the rotary shaft 2. Further, the neighboring rotor cores 32 are fixed by welding, adhering, or winding of a plastic belt.

The rotor fixing member 31 includes a connecting member 311 and a clamping member 312. The connecting member 311 is connected with the rotary shaft 2, and extends in the radial direction. The clamping member 312 is connected with a distal end of the connecting member 311, and clamps and fixes the rotor core 32 from the circumference of the rotor core 32. The material of the rotor fixing member 31 is not particularly limited as long as it is a non-magnetic material. However, a non-magnetic metal such as stainless steel, carbon fiber or an organic material with even lower electrical conductivity, or a highly strong and tough ceramic material is preferred.

Meanwhile, the stator 4 includes a plurality of the (in this example, six) stator cores (the second winding cores) 42, stator fixing members 41 that fix the stator cores 42, respectively, and coils 43 wound around the stator cores 42, respectively. The stator cores 42 are arranged at equal intervals along the circumferential direction of the motor 1.

The stator cores 42 are, for example, cut cores that are made from a soft magnetic material and formed into a U shape. As shown in FIG. 3, the cut core is formed as the wound body 3a is divided, the wound body 3a being made as a belt-shaped soft magnetic material is wound more than once. The stator core 42 is arranged so that its width direction extends along the rotational direction of the rotor 3.

The material of the stator core 42 is not particularly limited as long as it is a soft magnetic material, and may be, for example, an oriented or non-oriented electromagnetic steel sheet, iron-based soft magnetic amorphous, cobalt-based soft magnetic amorphous, a nanocrystal soft magnetic material, or an iron-cobalt permendur material. However, it is preferred to use the oriented electromagnetic steel sheet. This is because, in the case of the oriented electromagnetic steel sheet, a crystal orientation is aligned with a longitudinal direction (also referred to as a rolling direction) of the oriented electromagnetic steel sheet, and, since the oriented electromagnetic steel sheet has an axis of easy magnetization in that direction, the stator core 42 formed is given an excellent magnetic characteristic.

The methods for forming the stator cores 42 and the rotor cores 32 are not limited to the methods described above. For example, the cores may be formed as the belt-shaped soft magnetic material is curved into the U shape and a plurality of them is layered. Further, instead of layering the belt-shaped soft magnetic material, the cores may be formed in different methods such as sintering and casting of the belt-shaped soft magnetic material.

The stator core 42 has the two end surfaces (divided surfaces) 42a, 42b that face the same direction. For example, the end surface 42a of the stator core 42 faces the end surface 32a of the rotor core 32, and the end surface 42b faces the end surface 32b of the rotor core 32.

As shown in FIG. 2, there are two sets of the stator 4. The stator 4 of the first set, and the stator 4 of the second set are arranged next to each other along the axis direction of the rotary shaft 2. Then, the neighboring stator cores 42 are fixed by welding, adhering, or winding of a plastic belt.

The stator fixing member 41 includes a contact portion 411, insertion portions 412, and a holding portion 413. The contact portion 411 is in contact with an outer wall of the side surface portion 51 of the case 5. The insertion portions 412 are both ends of the contact portion 411 bent and inserted into slits (not shown) provided in the side surface portion 51 of the case 5, respectively. The holding portion 413 is connected with the insertion portions 412 and holds the coil 43 and the stator core 42. The material of the stator fixing member 41 is not particularly limited as long as it is a non-magnetic material. However, a non-magnetic metal such as stainless steel, carbon fiber or an organic material with even lower electrical conductivity, or a ceramic material that is highly strong and tough is preferred.

Figure 4:
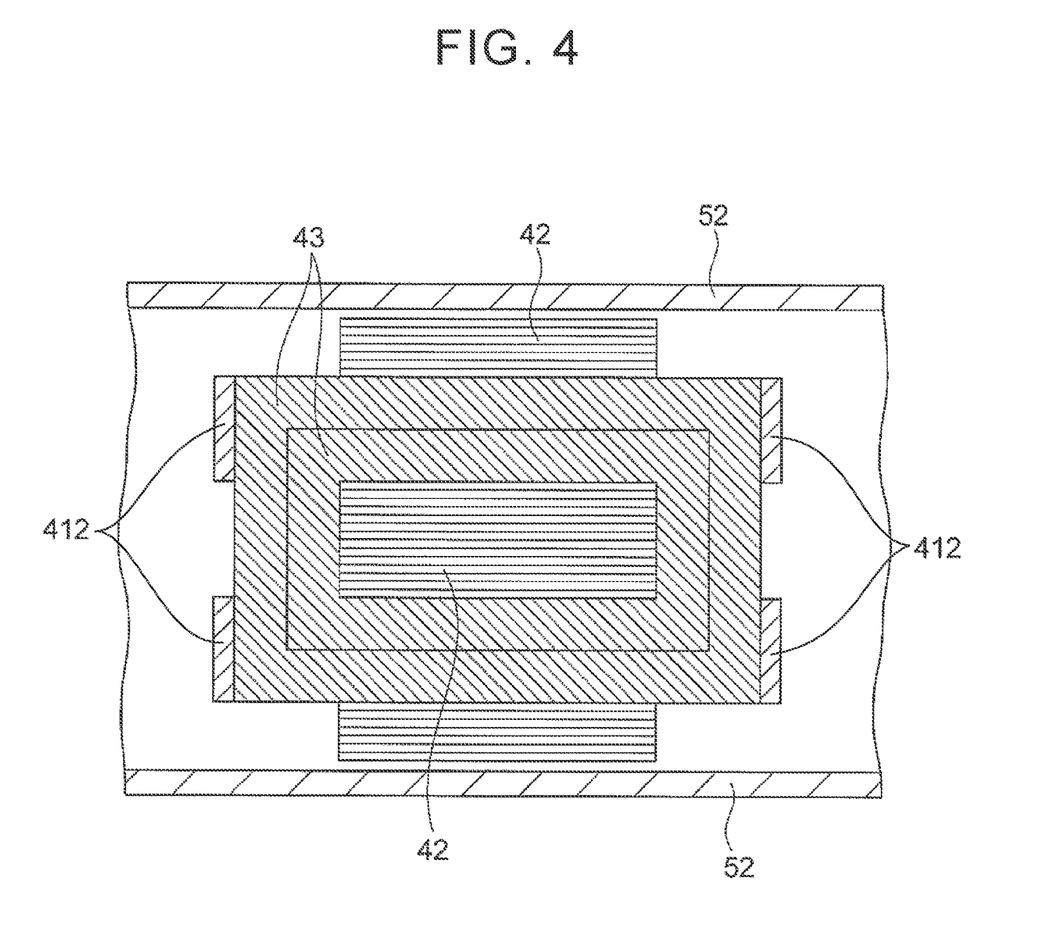
FIG. 4 is a schematic partial sectional view taken along the line B-B in FIG. 2.

The coil 43 is a winding made as a conducting wire is wound a plurality of turns. For example, in the embodiment, as shown in FIG. 4, the coil 43 is wound in two layers around the neighboring stator cores 42.

When, for example, the coil 43 is energized with rectangular wave current at given timing, magnetic flux is generated inside the stator core 42, and the rotor 3 rotates as the rotor core 32 of the rotor 3 is sucked with respect to the magnetic flux. Specifically, as the coil 43 wound around the given stator core 42 is energized, the magnetic flux is generated in the given stator core 42, and the rotor core 32 is pulled to a position facing the given stator core 42 due to the magnetic flux, and the rotor core 32 is rotated by a given angle. Next, as energization of the coil 43 of the given stator core 42 is stopped, and the coil 43 of the neighboring stator core 42 is energized, magnetic flux is generated in the neighboring stator core 42. Thus, due to the magnetic flux of the neighboring stator core 42, the rotor core 32 is pulled to a position facing the neighboring stator core 42, and the rotor core 32 is rotated further by the given angle. Repetition of this causes the rotor 3 to rotate continuously.

Next, description is given regarding an example of a combination of the number of the rotor cores 32 and the number of the stator cores 42. Here, Nr represents the number of the rotor cores 32, Ns represents the number of the stator cores 42, and ε represents a step angle. A rotor angle (in other words, an arrangement interval of the rotor cores 32 in the circumferential direction of the motor 1) θr is calculated by θr=360°/Nr. A stator angle (in other words, an arrangement interval of the stator cores 42 in the circumferential direction of the motor 1) θs is calculated by θs=360°/Ns. The step angle ε means a rotation angle of the rotary shaft 2 per one pulse of the rectangular wave current input to the coil 43.

When the number Ns of the stator cores 42 is larger than the number Nr of the rotor cores 32 (in other words, in the case of Ns>Nr), the step angle ε is ε=360°(1/Nr−1/Ns). Thus, Ns=360°×Nr/(360°−ε×Nr). With use of this formula, it is possible to obtain a combination where Nr and Ns are integral numbers with respect to an arbitral step angle ε. An example of this is shown in Table 1 below.

TABLE 1

| No. | Ns | Nr | Number of poles realizing synchronous state | Number of phases | Stator angle θs | Rotor angle θr | Step angle ε |
|---|---|---|---|---|---|---|---|
| 1 | 12 | 6 | 6 | 2 | 30 | 60 | 30 |
| 2 | 15 | 10 | 5 | 3 | 24 | 36 | 12 |
| 3 | 16 | 8 | 8 | 2 | 22.5 | 45 | 22.5 |
| 4 | 18 | 12 | 6 | 3 | 20 | 30 | 10 |
| 5 | 18 | 9 | 9 | 2 | 20 | 40 | 20 |
| 6 | 20 | 10 | 10 | 2 | 18 | 36 | 18 |
| 7 | 24 | 16 | 8 | 3 | 15 | 22.5 | 7.5 |
| 8 | 24 | 12 | 12 | 2 | 15 | 30 | 15 |
| 9 | 24 | 8 | 8 | 3 | 15 | 45 | 30 |
| 10 | 30 | 20 | 10 | 3 | 12 | 18 | 6 |
| 11 | 30 | 15 | 15 | 2 | 12 | 24 | 12 |
| 12 | 30 | 10 | 10 | 3 | 12 | 36 | 24 |
| 13 | 36 | 24 | 12 | 3 | 10 | 15 | 5 |
| 14 | 45 | 30 | 15 | 3 | 8 | 12 | 4 |

Meanwhile, when the number Ns of the stator cores 42 is smaller than the number Nr of the rotor cores 32 (in other words, in the case of Ns<Nr), the step angle ε is ε=360°(1/Ns−1/Nr). Therefore, Ns=360°×Nr/(360°+ε×Nr). With use of this formula, it is possible to obtain a combination where the Nr and the Ns are integral numbers with respect to an arbitral step angle ε. An example of this is shown in Table 2 below.

TABLE 2

| No. | Ns | Nr | Number of poles realizing synchronous state | Number of phases | Stator angle θs | Rotor angle θr | Step angle ε |
|---|---|---|---|---|---|---|---|
| 1 | 10 | 15 | 5 | 2 | 36 | 24 | 12 |
| 2 | 15 | 20 | 5 | 3 | 24 | 18 | 6 |
| 3 | 16 | 24 | 8 | 2 | 22.5 | 15 | 7.5 |
| 4 | 16 | 32 | 16 | 2 | 22.5 | 11.25 | 11.25 |
| 5 | 18 | 30 | 6 | 3 | 20 | 12 | 8 |
| 6 | 18 | 36 | 18 | 2 | 20 | 10 | 10 |
| 7 | 20 | 30 | 10 | 2 | 18 | 12 | 6 |

TABLE 2-continued

| No. | Ns | Nr | Number of poles realizing synchronous state | Number of phases | Stator angle θs | Rotor angle θr | Step angle ε |
|---|---|---|---|---|---|---|---|
| 8 | 20 | 40 | 20 | 2 | 18 | 9 | 9 |
| 9 | 24 | 32 | 8 | 3 | 15 | 11.25 | 3.75 |
| 10 | 24 | 36 | 12 | 2 | 15 | 10 | 5 |
| 11 | 24 | 40 | 8 | 3 | 15 | 9 | 6 |
| 12 | 24 | 48 | 24 | 2 | 15 | 7.5 | 7.5 |
| 13 | 30 | 40 | 10 | 3 | 12 | 9 | 3 |
| 14 | 30 | 45 | 15 | 2 | 12 | 8 | 4 |
| 15 | 30 | 60 | 30 | 2 | 12 | 6 | 6 |

Out of the combinations shown in Table 1 and Table 2, the combinations of a three-phase driven motor operated by a general-purpose inverter, or a two-phase driven motor where inverter elements can be reduced, and the number of poles of 6 or larger that realizes synchronicity are especially powerful combinations because high torque is obtained.

In the motor 1 according to the embodiment, a width Wr of the rotor core 32 and a width Ws of the stator core 42 may be different. For example, as shown in FIG. 1, it is preferred that the width Wr of the rotor core 32 is larger than the width Ws of the stator core 42. Thus, it is possible to ensure a large space for the coil 43, and thus increase the number of turns of the coil 43. Therefore, it is possible to increase the output torque of the motor 1.

Figure 5:
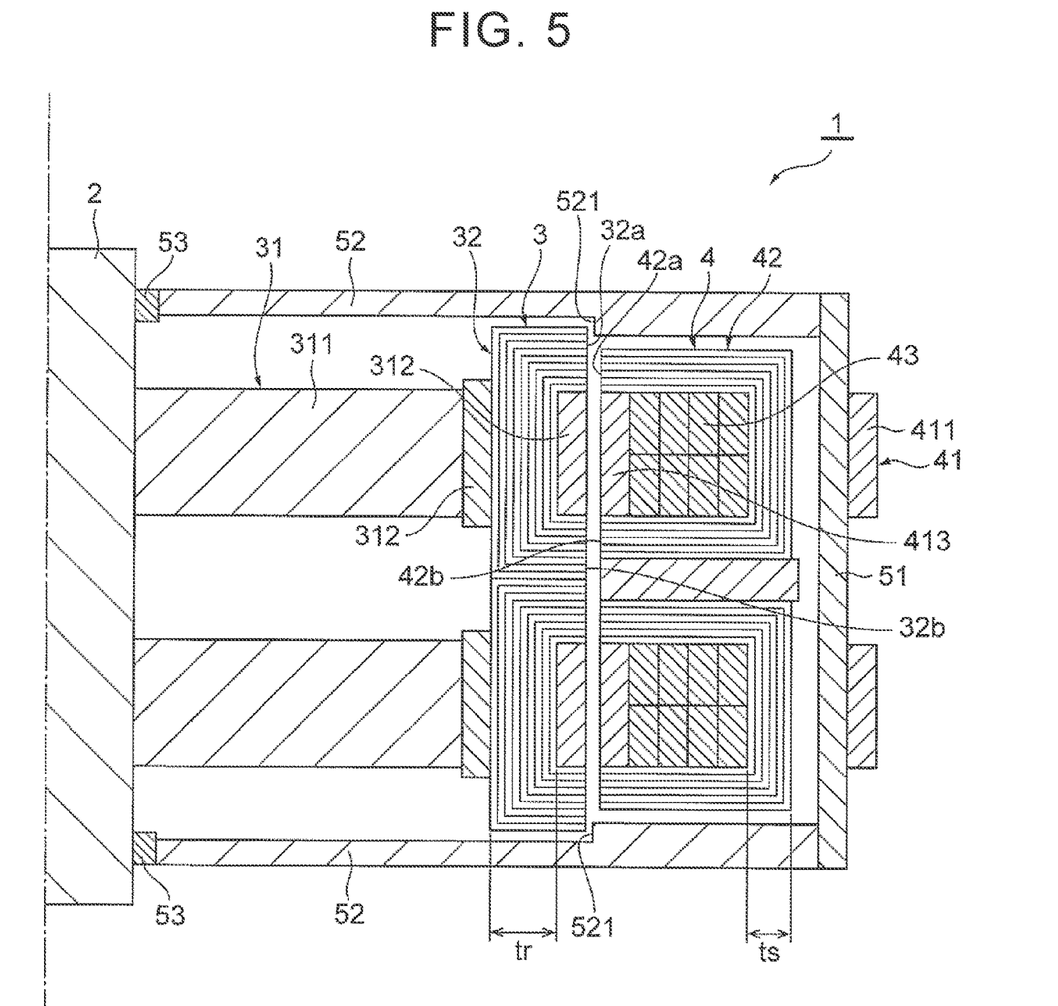
FIG. 5 is a schematic sectional view of a case where a thickness of the rotor core is larger than a thickness of the stator core.

Further, in the motor 1 according to the embodiment, the thickness tr of the rotor core 32, and the thickness is of the stator core 42 may be different. For example, as shown in FIG. 5, it is preferred that the thickness tr of the rotor core 32 is larger than the thickness ts of the stator core 42. Thus, it is possible to further increase the output torque of the motor 1. Further, as the thickness tr of the rotor core 32 is set to be larger than the thickness ts of the stator cores 42, a length of the rotor core 32 becomes larger in the axis direction of the rotary shaft 2. Therefore, a step portion 521 may be provided in each of the lid portions 52 so as to avoid interference between the rotor core 32 and the lid portions 52 (see FIG. 5).

The motor 1 constructed as described above has a structure in which the stator 4 having the stator cores 42, and the coils 43 wound around the stator cores 42, respectively, is arranged outwardly of the rotor 3. Therefore, compared to a conventional outer rotor-type motor, it is possible to ensure a larger space for the coils 43 easily, and thus increase the number of turns of the coils 43. As a result, the output torque of the motor 1 is increased, and size reduction of the motor 1 is realized. In addition to this, there are at least two sets of the rotor 3 and the stator 4, and the sets are stacked in the axis direction of the rotary shaft 2. Therefore, compared to a case where one rotor and one stator are provided, it is possible to further improve the output torque of the motor 1.

Figure 6:
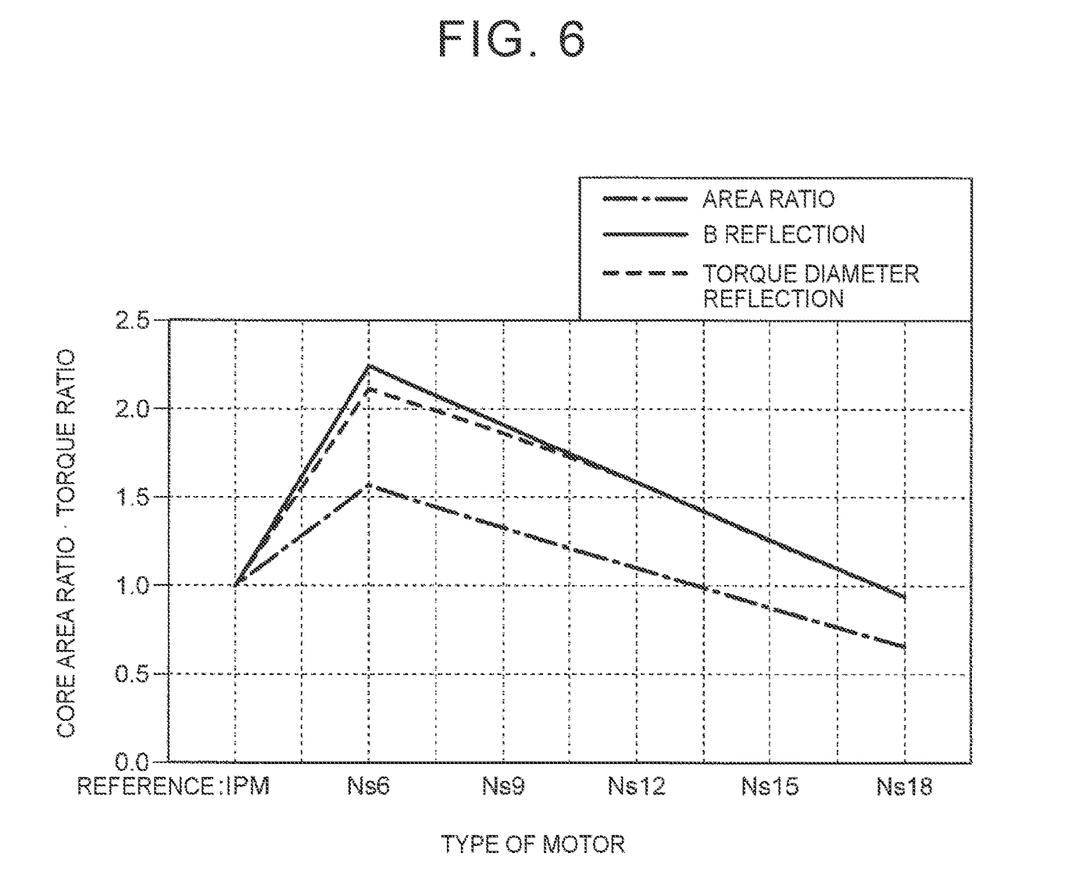
FIG. 6 is a view showing core area ratio torque ratio of the motor according to the embodiment and a current IPM motor.

In order to verify the effects of the motor 1, the present inventors investigated core area ratio torque ratio with use of motors having the combinations shown in Table 3, respectively, while using a current interior permanent magnet (IPM) motor as a reference for comparison. FIG. 6 shows the result. In FIG. 6, an "area ratio" represented by a dashed line is shown as an indicator of torque with respect to the current IPM motor based on a proportional relation between output torque of the motor and the core area (the entire magnetic pole area). The "B reflection" represented by a solid line reflects an influence of magnetic flux density B and an influence of the core area based on a proportional relation between the output torque of the current IPM motor and the magnetic flux density B, and a proportional relation between the output torque of the motor 1 according to the embodiment and the square of the magnetic flux density B. "Torque diameter reflection" represented by a broken line reflects the entire influences of the core area, the magnetic flux density B, and a median diameter of torque based on a proportional relation between the output torque of the motor and the median diameter of torque.

TABLE 3

| Ns | Nr | Shown in FIG. 6 as |
|---|---|---|
| 6 | 4 | Ns6 |
| 9 | 6 | Ns9 |
| 12 | 8 | Ns12 |
| 15 | 10 | Ns15 |
| 18 | 12 | Ns18 |

As seen in FIG. 6, with the motor according to the embodiment, the output torque of the motor is improved further than that of the current IPM motor.

Second Embodiment

Hereinafter, based on FIG. 7 to FIG. 9, a second embodiment of the motor is described. A motor 6 according to the second embodiment is different from the first embodiment described above in that the numbers of the rotor cores 32 and the stator cores 42 are the same, and the rotor cores 32 and the stator cores 42 are arranged so that width directions thereof are parallel to the axis direction of the rotary shaft 2, respectively. Hereinafter, the difference from the motor 1 according to the first embodiment is mainly described.

Figure 7:
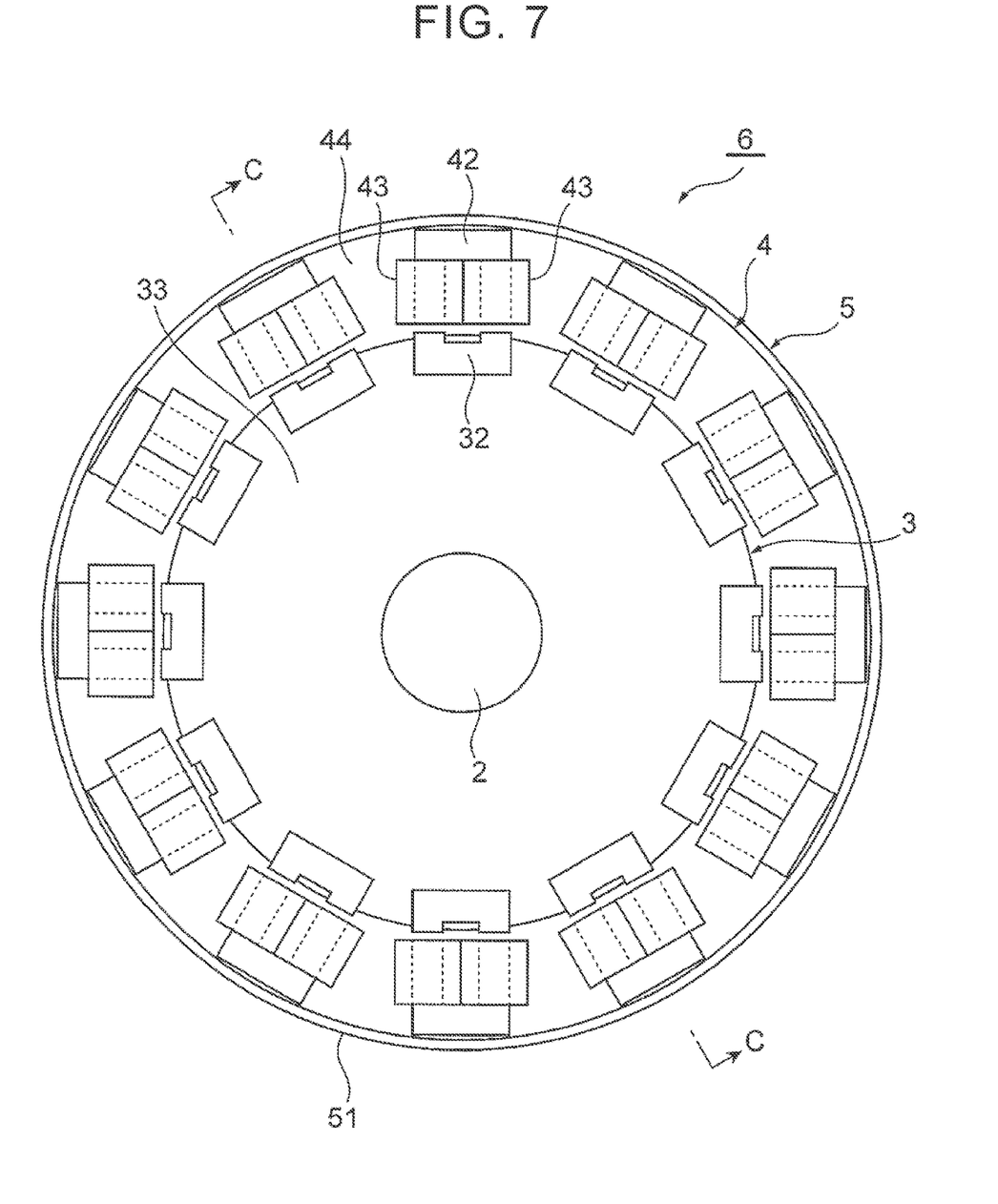
FIG. 7 is a schematic plan view of a motor according to a second embodiment.
Figure 8:
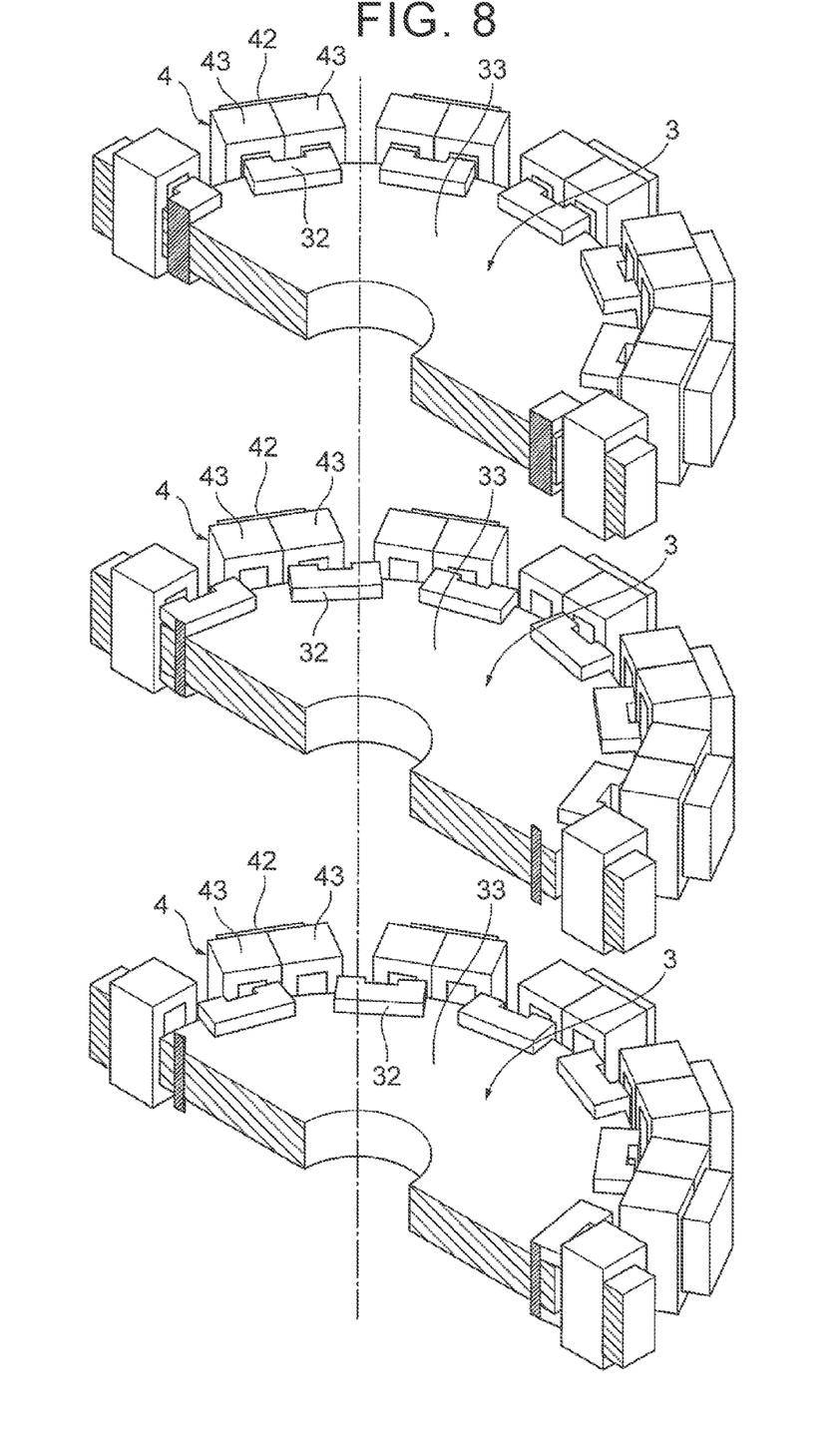
FIG. 8 is an exploded perspective view along the line C-C in FIG. 7.

FIG. 7 is a schematic plan view of the motor according to the second embodiment, and FIG. 8 is an exploded perspective view taken along the line C-C in FIG. 7. FIG. 7 shows a state where the lid portions 52 of the case 5 are removed so that an inside of the motor 6 is seen better. In FIG. 8, the case 5, the rotary shaft 2, and a stator base 44 described later are omitted.

As shown in FIG. 7 and FIG. 8, the motor 6 includes the metallic rotary shaft 2, the rotor 3 fixed to the rotary shaft 2, the stator 4, and the case 5 that accommodates the rotor 3 and the stator 4. The stator 4 is arranged so as to surround and face the rotor 3 with a gap from the rotor 3 in the radial direction. There are three sets of the rotor 3 and the stator 4 that are stacked along the axis direction of the rotary shaft 2. In the embodiment, the stator 4 and the rotor 3 located on the upper side with respect to the sheet surface of FIG. 8 are the first set, another stator 4 and another rotor 3 located on the lower side are the third set, and yet another stator 4 and yet another rotor 3 located between the first set and the third set are the second set. In each of the sets, the number of poles is 12 for both the rotor 3 and the stator 4 (that means Ns=Nr=12).

The number of the poles for the rotor 3 and the stator 4 is not limited to 12, and 3≤Ns=Nr≤40 is preferred in order to ensure output torque. Also, in consideration of the fact that large drive voltage is required when a frequency is too large, as well as a reduction of iron loss, 3≤Ns=Nr≤24 is more preferred.

The rotor 3 includes a disc-shaped rotor base (a rotor fixing member) 33 made from a non-magnetic material, and the 12 rotor cores 32 fixed along a circumferential direction of the rotor base 33 (in other words, a circumferential direction of the motor 6). The rotor base 33 is fixed to the rotary shaft 2. A material of the rotor base 33 is, for example, the same as the material of the rotor fixing member 31 described in the first embodiment. Then, the 12 rotor cores 32 are arranged so that the width direction of each of the rotor cores 32 is parallel to the axis direction of the rotary shaft 2, and arranged at equal intervals along the circumferential direction of the rotor base 33. The rotor cores 32 are fixed to the rotor base 33 as they are fit into through-holes (not shown) provided in the rotor base 33, respectively.

The stator 4 includes the annular disc-shaped stator base (a stator fixing member) 44 made from a non-magnetic material, the 12 stator cores 42 fixed along a circumferential direction of the stator base 44 (in other words, the circumferential direction of the motor 6), and the coils 43 wound around the stator cores 42, respectively. The stator base 44 is fixed to the case 5. A material of the stator base 44 is, for example, the same as the material used for the stator fixing member 41 described in the first embodiment. Then, the 12 stator cores 42 are arranged so that the width direction of each of the stator cores 42 is parallel to the axis direction of the rotary shaft 2, and are arranged at equal intervals along the circumferential direction of the stator base 44. The stator cores 42 are fixed to the stator base 44 as they are fit into through-holes (not shown) provided in the stator base 44. The two coils 43 that are connected in series with each other are wound around each of the stator cores 42.

In the motor 6 according to the embodiment, when the number of sets of the rotor 3 and the stator 4 is n, energization of each of the sets is switched so that each of the rotors 3 in the first through the n-th sets is rotated by 360°/(Ns×n). Since Ns=12 and n=3 as described above, energization of the three sets is switched in turn so that the rotors 3 in the first through the third sets are rotated by 360°/(12×3)=10°. In this case, the motor 6 is a three-phase driving motor. Hereinafter, details are given based on FIG. 9. Directions shown by arrows in FIG. 9 represent a rotational direction of the rotor 3 (in other words, a rotational direction of the rotary shaft 2).

Figure 9:
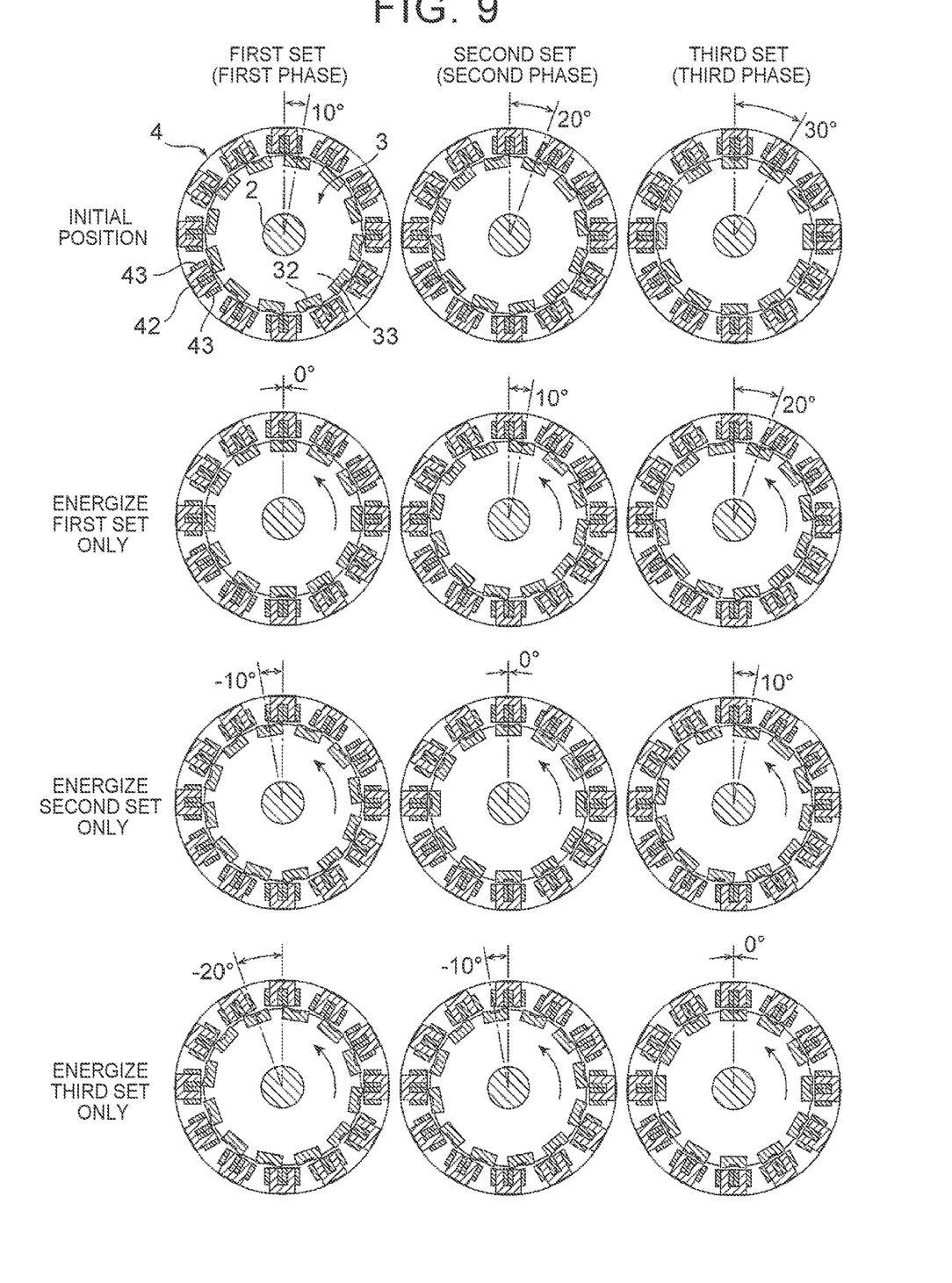
FIG. 9 is a sectional view describing energization of the motor according to the second embodiment.

As shown in FIG. 9, at an initial position, each of the rotor cores 32 of the first set is arranged at a position rotated by 10° in a direction (here, the clockwise direction) opposite to the rotational direction of the rotary shaft 2, with respect to each of the stator cores 42 of the first set. Each of the rotor cores 32 of the second set is arranged at a position rotated by 20° in the clockwise direction with respect to each of the stator cores 42 of the second set. Each of the rotor cores 32 of the third set is arranged at a position rotated by 30° in the clockwise direction with respect to each of the stator cores 42 of the third set. This means that the rotor cores 32 of the first set through the third set are arranged at positions rotated by 10° in the clockwise direction from set to set. Meanwhile, the stator cores 42 of the first set through the third set are arranged at the same positions, respectively, with respect to the axis direction of the rotary shaft 2. This means that the positions where the stator cores 42 of the all sets are arranged are the same, respectively.

When only the coils 43 wound around the stator cores 42, respectively, of the first set are energized (when only the first set is energized) from the initial position, magnetic flux is generated in the stator cores 42, and the rotor cores 32 of the first set are sucked by the magnetic flux, and the rotor 3 of the first set is rotated by 10° in the rotational direction of the rotary shaft 2 (here, the counterclockwise direction). As the rotor 3 of the first set is rotated, the rotors 3 of the second set and the third set that are fixed to the rotary shaft 2 similarly to the rotor 3 of the first set are also rotated by 10° in the counterclockwise direction. Therefore, as shown in FIG. 9, when only the coils 43 wound around the stator cores 42 of the first set are energized, the rotor cores 32 of the first set are positioned at 0° with respect to the stator cores 42 of the first set (in other words, the positions of the rotor cores 32 and the stator cores 42 coincide with each other, respectively), and the rotor cores 32 of the second set are positioned at 10° with respect to the stator cores 42 of the second set, respectively, in the clockwise direction. Also, the rotor cores 32 of the third set are positioned at 20° with respect to the stator cores 42 of the third set, respectively, in the clockwise direction.

Next, when only the coils 43 wound around the stator cores 42 of the second set, respectively, are energized (when only the second set is energized), magnetic flux is generated in the stator cores 42, and the rotor cores 32 of the second set are sucked, and the rotor 3 of the second set is rotated by 10° in the counterclockwise direction. Thus, the rotors 3 of the first set and the third set are rotated in the counterclockwise direction by 10°, respectively. Therefore, as shown in FIG. 9, when only the coils 43 wound around the stator cores 42 of the second set, respectively, are energized, the rotor cores 32 of the first set come to positions at 10° with respect to the stator cores 42 of the first set in the counterclockwise direction (−10° in FIG. 9), respectively, and the rotor cores 32 of the second set come to positions at 0° with respect to the stator cores 42 of the second set, respectively (in other words, the positions of the rotor cores 32 and the stator cores 42 coincide with each other, respectively), and the rotor cores 32 of the third set are positioned at 10° with respect to the stator cores 42 of the third set, respectively, in the clockwise direction.

Next, when only the coils 43 wound around the stator cores 42 of the third set, respectively, are energized (when only the third set is energized), magnetic flux is generated in the stator cores 42. Thus, the rotor cores 32 of the third set are sucked, and the rotor 3 of the third set is rotated by 10° in the counterclockwise direction. As a result, the rotors 3 of the first set and the second set are rotated by 10° in the counterclockwise direction. Therefore, as shown in FIG. 9, when only the coils 43 wound around the stator cores 42 of the third set, respectively, are energized, the rotor cores 32 of the first set come to positions at 20° with respect to the stator cores 42 of the first set in the counterclockwise direction, respectively (−20° in FIG. 9), the rotor cores 32 of the second set come to positions at 10° with respect to the stator cores 42 of the second set in the counterclockwise direction, respectively (−10° in FIG. 9), and the rotor cores 32 of the third set are positioned at 0° with respect to the stator cores 42 of the third set, respectively (in other words, the positions of the rotor cores 32 and the stator cores 42 coincide with each other, respectively).

As energization of each of the sets is switched repeatedly as described above, the rotors 3 are rotated continuously.

With the motor 6 according to the embodiment, effects similar to those of the first embodiment described above are obtained, and it is possible to drive the motor 6 more smoothly.

Also, in the embodiment, for example, the rotor cores 32 of all sets may be arranged at the same positions, respectively, and at the initial position, the stator cores 42 of the first set may be arranged at positions rotated by 10° in the rotational direction of the rotary shaft 2 (for example, the counterclockwise direction) with respect to the rotor cores 32 of the first set. In addition, the stator cores 42 of the first set through the third set may be arranged at positions rotated by 10° in the rotational direction of the rotary shaft 2 from set to set. Thus, as energization of each of the sets described above is switched repeatedly, it is possible to drive the motor 6 more smoothly.

Further, in the motor 6 according to the embodiment, it is preferred that the number of sets n of the rotor 3 and the stator 4 is 2≤n≤5. This is because, when the number of sets exceeds five, a length of the motor in the axis direction of the rotary shaft 2 becomes large, and a size reduction of the motor 6 is hindered.

The present inventors also used the motor 6 (a radial gap-type motor) according to the embodiment, and a conventional axial gap-type SR motor (AGSRM) having the same volume in order to compare a torque ratio, a rotor diameter ratio a that affects the torque, a length ratio b of a rotational force generating part, and a duplicate ratio c of magnetic flux density, with reference to the AGSRM. The results are shown in Table 4. The "rotor diameter" is based on AGSRM, and corresponds to a thickness of the rotor core 32 (see tr shown in FIG. 3) in the motor according to the embodiment. Further, the "length of the rotational force generating part" corresponds to a width of the stator core 42 of the motor according to the embodiment (see Ws shown in FIG. 1).

As understood from Table 4, in the motor 6 according to the embodiment, it is possible to increase the rotor diameter with respect to the conventional AGSRM. Further, in the conventional AGSRM, only a non-oriented electromagnetic steel sheet is applicable. However, in the motor 6 according to the embodiment, an oriented electromagnetic steel sheet is applicable. When the oriented electromagnetic steel sheet is applied, the magnetic flux density is increased, and it is thus possible to increase torque. As a result, even with the radial gap-type motor without magnet, it is possible to obtain the same or higher torque than that of the conventional AGSRM.

TABLE 4

|  | Rotor diameter ratio a | Length ratio b of rotational force generating part | Duplicate ratio c of magnetic flux density | Torque ratio = a × b × c |
|---|---|---|---|---|
| AGSRM | 1 | 1 | 1 | 1 |
| Motor according to the embodiment | 1.42 | 0.56 | 1.38 | 1.09 |

The embodiments of the disclosure have been described in detail. However, the disclosure is not limited to the above embodiments, and various design changes may be made without departing from the spirit of the disclosure described in the claims.

What is claimed is:

1. A motor comprising:
a rotor fixed to a rotary shaft; and
a stator arranged so as to surround the rotor with a gap from the rotor in a radial direction orthogonal to an axis direction of the rotary shaft, wherein:
the rotor includes a plurality of first winding cores made from a soft magnetic material, and a rotor fixing member that fixes the first winding cores;
the stator includes a plurality of second winding cores made from a soft magnetic material, a stator fixing member that fixes the second winding cores, and coils wound around the second winding cores, respectively; and
the motor includes at least two sets of the rotor and the stator, and the sets are stacked in the axis direction of the rotary shaft;
wherein the first winding cores and the second winding cores are arranged so that widths directions of the first winding cores and the second winding cores extend along a rotational direction of the rotor; and
a width of each of the first winding cores is larger than a width of each of the second winding cores.

2. The motor according to claim 1, wherein:
the first winding cores and the second winding cores are arranged so that width directions of the first winding cores and the second winding cores are parallel to the axis direction of the rotary shaft;
the number of the first winding cores and the number of the second winding cores are the same; and
when the number of the second winding cores is Ns, and the number of sets of the rotor and the stator is n, energization of each of the sets is switched so that the rotor of each of the first set through the n-th set is rotated by 360°/(Ns×n).

3. The motor according to claim 2, wherein:
the second winding cores of all of the sets are arranged at the same positions, respectively; and
at an initial position, the first winding cores of the first set are arranged at positions rotated by 360°/(Ns×n) in a direction opposite to a rotational direction of the rotary shaft with respect to the second winding cores of the first set, respectively, and also the first winding cores of the first set through the n-th set are arranged at positions rotated by 360°/(Ns×n) in the direction opposite to the rotational direction of the rotary shaft from set to set.

4. The motor according to claim 2, wherein:
the first winding cores of all of the sets are positioned at the same positions, respectively; and
at an initial position, the second winding cores of the first set are arranged at positions rotated by 360°/(Ns×n) in a rotational direction of the rotary shaft with respect to the first winding cores of the first set, respectively, and also the second winding cores of the first set through the n-th set are arranged at positions rotated by 360°/(Ns×n) in the rotational direction of the rotary shaft from set to set.

* * * * *